US012650033B2

(12) United States Patent
Ariaratnam et al.

(10) Patent No.: US 12,650,033 B2
(45) Date of Patent: Jun. 9, 2026

(54) COMBINATION WINDOW LATCH

(71) Applicant: Roto Frank of America, Inc., Chester, CT (US)

(72) Inventors: Suban Ariaratnam, Toronto (CA); Christopher Griffin, Groton, CT (US); Robert Christie, South Glastonbury, CT (US); Jason Sorrentino, Haddam, CT (US)

(73) Assignee: Roto Frank of America, Inc., Chester, CT (US)

( * ) Notice: Subject to any disclaimer, the term of this patent is extended or adjusted under 35 U.S.C. 154(b) by 76 days.

(21) Appl. No.: 18/289,107

(22) PCT Filed: May 4, 2022

(86) PCT No.: PCT/US2022/027668
§ 371 (c)(1),
(2) Date: Oct. 31, 2023

(87) PCT Pub. No.: WO2022/235797
PCT Pub. Date: Nov. 10, 2022

(65) Prior Publication Data
US 2024/0218706 A1 Jul. 4, 2024

Related U.S. Application Data

(60) Provisional application No. 63/184,047, filed on May 4, 2021.

(51) Int. Cl.
*E05B 65/08* (2006.01)
*E05C 3/04* (2006.01)
*E05C 7/00* (2006.01)

(52) U.S. Cl.
CPC ........ *E05B 65/0841* (2013.01); *E05B 65/087* (2013.01); *E05C 3/045* (2013.01); *E05C 3/046* (2013.01); *E05C 2007/007* (2013.01)

(58) Field of Classification Search
CPC ...... E05C 2007/007; E05C 1/12; E05C 3/045; E05C 3/046; E05C 9/066; E05C 19/008;
(Continued)

(56) References Cited

U.S. PATENT DOCUMENTS 5,715,631 A * 2/1998 Kailian ............... E05B 65/0876 292/172
5,992,907 A * 11/1999 Sheldon ................. E05D 15/22 292/141

(Continued)

*Primary Examiner* — Christine M Mills
*Assistant Examiner* — Faria F Ahmad
(74) *Attorney, Agent, or Firm* — Dennemeyer & Associates LLC

(57) ABSTRACT

A window combination latch (140) includes a sash lock (142) and tilt a latch assembly (230). The sash lock (142) installs on a top rail of a window sash (110) and includes a cam (214) that rotatably couples with a keeper (144) to lock the window sash (110). The cam (214) includes a slot (320). The latch assembly (230) when installed has a tip (422) of a latch bolt (232) adjacent to a surface of a stile (112) of the window sash (110) and a head (412) of the latch bolt (232) engaged in the slot (320). The latch bolt (232) may be a one-piece structure that may include a flexible extension (414).

14 Claims, 8 Drawing Sheets

(58) Field of Classification Search
CPC ............... E05B 65/0841; E05B 65/087; E05B 65/0876; Y10S 292/20; Y10S 292/47
See application file for complete search history.

(56) References Cited

U.S. PATENT DOCUMENTS

| | | | | |
|---|---|---|---|---|
| 6,176,041 | B1 | 1/2001 | Roberts | |
| 6,607,221 | B1 | 8/2003 | Elliott | |
| 6,957,513 | B2 * | 10/2005 | Pettit | E05C 9/00<br>292/141 |
| 7,607,262 | B2 * | 10/2009 | Pettit | E05C 9/00<br>49/185 |
| 8,132,369 | B2 * | 3/2012 | Pettit | E05C 1/14<br>292/DIG. 20 |
| 8,205,919 | B2 * | 6/2012 | Flory | E05C 1/12<br>292/DIG. 20 |
| 9,163,437 | B1 * | 10/2015 | Lawrence | E05C 1/14 |
| 9,234,374 | B2 * | 1/2016 | Wolf | E05C 9/021 |
| 9,719,279 | B2 * | 8/2017 | Subliskey | E05C 1/12 |
| 10,704,297 | B2 * | 7/2020 | Liang | E05C 1/12 |
| 2003/0084614 | A1 | 5/2003 | Pettit et al. | |
| 2009/0265996 | A1 | 10/2009 | Flory | |
| 2010/0083578 | A1 | 4/2010 | Albrecht | |
| 2013/0214545 | A1 | 8/2013 | Wolf et al. | |
| 2015/0376920 | A1 * | 12/2015 | Subliskey | E05C 9/025<br>49/506 |
| 2016/0069108 | A1 * | 3/2016 | Liang | E05B 9/08<br>292/165 |

* cited by examiner

COMBINATION WINDOW LATCH

BACKGROUND

Window hardware is often desired that meets a traditional aesthetic or standard but that provides modern or enhanced functionality. Window hardware such as window latches often need to work with or operate with existing components but provide additional features or functions not traditionally available. A window latch system, for example, may need to operate in multiple modes to permit locking a window, sliding a window sash in the window open or closed, or tilting the window sash.

BRIEF DESCRIPTION OF THE DRAWINGS

FIG. 1-2 shows an enlarged view of a portion of the window latch system of FIG. 1-1.

FIG. 1-3 shows the window of FIG. 1-1 with the window latch system in an unlocked and opened position and a lower sash partially raised.

FIG. 1-4 shows the window of FIG. 1-1 with the window latch system in a tilt position and the lower sash tilted.

FIGS. 2-1, 2-2, and 2-3 respectively show a top view, a bottom view, and a cross-sectional view of a system including a sash lock, keeper, and tilt latch in accordance with an example of the present disclosure.

FIG. 3-1 shows a sash lock in accordance with an example of the present disclosure.

FIG. 3-2 shows a cam for the sash lock of FIG. 3-1.

FIG. 4-1 shows a latch bolt in accordance with an example of the present disclosure.

FIG. 4-2 shows a tilt latch assembly including the latch bolt of FIG. 4-1.

FIG. 4-3 shows a spring stop clip that may be used in the tilt latch assembly of FIG. 4-2.

FIGS. 5-1, 5-2, and 5-3 show partially transparent views of a combination latch in accordance with an example of the present disclosure respectively in lock, unlock, and tilt positions.

The drawings illustrate examples for the purpose of explanation and are not of the invention itself. Use of the same reference symbols in different figures indicates similar or identical items.

DETAILED DESCRIPTION

A window latch system can enable locking, sliding, and tilting of a window sash in a window frame and may fit existing routing profiles for windows. In one example, a two-handed combination window latch system includes a pair of sash locks. Another example of window latch system in accordance with the present disclosure may consist of a single sash lock and two tilt latch assemblies for a one-handed combination window latch system. A structure that may be used in two-handed or one-handed systems may include a one-piece latch bolt that is spring loaded in a latch housing, a spring stopping feature that may be a separate piece from the latch bolt in the latch housing, and a sash lock with a cam having a slot that may be shaped to engage with and operate the one-piece latch bolt. The systems described herein may be easy to manufacture and may require minimal assembly for a user such as a window manufacturer or a consumer.

Figure 1:
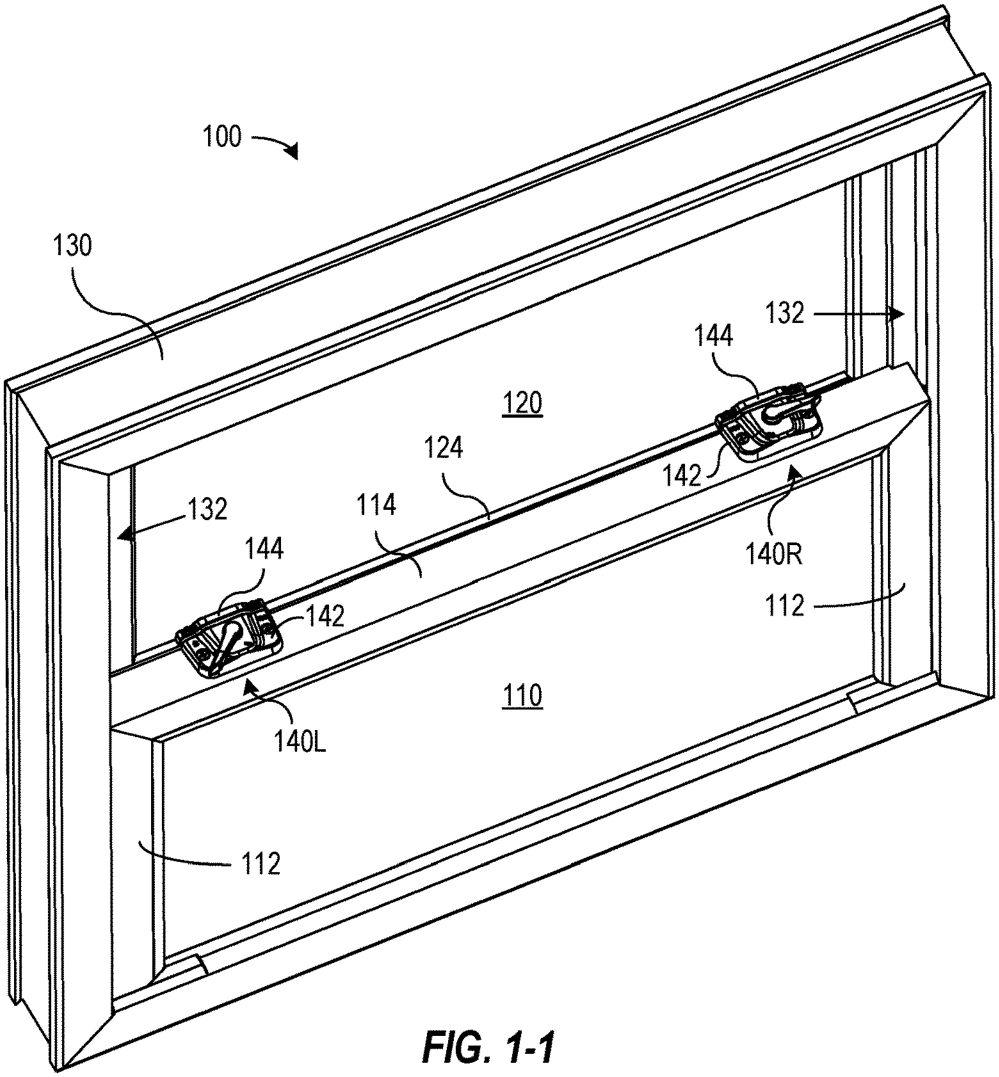
FIG. 1-1 shows a window with an installed window latch system in accordance with an example of the present disclosure.

FIG. 1-1 shows an example of a window 100 in accordance with an example of the present disclosure. Window 100 includes a bottom sash 110 and a top sash 120 mounted in a window frame 130. The window latch system for window 100 of FIG. 1-1 is a two-handed window latch system including two combination latches 140L and 140R. Latches 140L and 140R may be left-handed and right-handed versions of the same basic mechanism and are sometimes generically referred to herein as combination latches 140. Combination latches 140L and 140R generally limit movements of one or both sashes 110 and 120 in window frame 130. Depending on the configuration of combination latches 140L and 140R, combination latches 140L and 140R may lock bottom sash 110 in place, free sash 110 to slide vertically in window frame 130, or permit tilting of sash 110. Top sash 120 may be permanently fixed in window frame 130 or may be locked or able slide vertically in window frame 130 depending on the configuration of combination latches 140L and 140R.

Figures 1, 2:
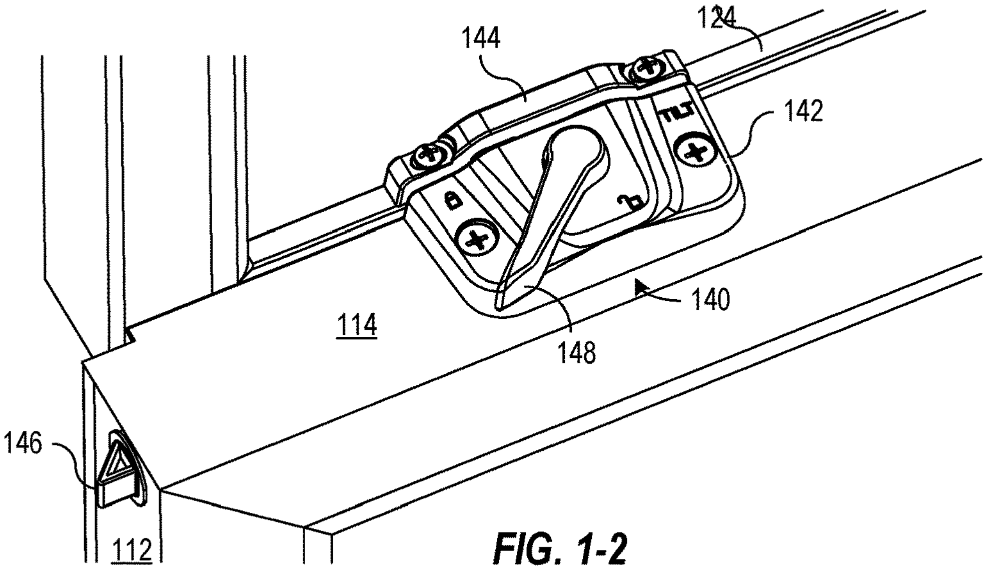

FIG. 1-2 shows more details of a combination latch 140 in accordance with an example of the present disclosure. In this example, combination latch 140 includes a sash lock 142 mounted on a check rail 114 of bottom sash 110 and a sash lock keeper 144 mounted on check rail 124 of top sash 120. As described further below, sash lock 142 includes a cam (not visible in FIG. 1-2) that rotates when a sash lock handle 148 of sash lock 142 is rotated. The cam is eccentric and, when lower sash 110 is closed and sash lock handle 148 is rotated to the lock position of sash lock 142, a hook or other portion of the cam engages sash lock keeper 144 to lock bottom sash 110 and top sash 120 together in window 100.

Figures 1, 2, 3:
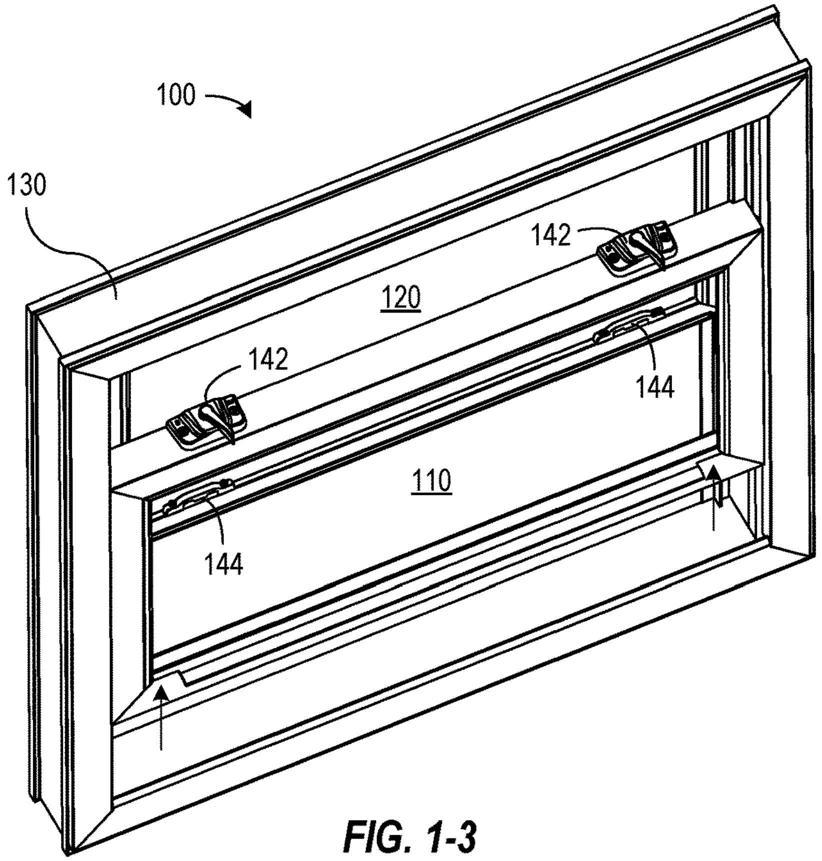

Each combination latch 140 further includes a latch bolt 146 that is a one-piece structure including a head engaged in a slot in the cam in sash lock 142. Latch bolt 146 extends from sash lock 142 through check rail 114 and stile 112 of bottom sash 110. A tip of latch bolt 146 projects from stile 112 and fits into a vertical track 132 in window frame 130 when sash lock handle 148 of combination latch 140 is in a "lock" position or an "unlock" position. When sash lock handle 148 of combination latch 140 is in a "tilt" position, the tip of latch bolt 146 is flush with or recessed from the side surface of stile 112. Bottom sash 110 further has pivot pins (not shown) that project from stiles 112 below latch bolts 146 and that also fit into vertical tracks 132 in window frame 130. When sash lock handles 148 of both combination latches 140L and 140R are in their unlock positions, the tips of both latch bolts 146 and both lower pivot pins project from stiles 112, engage tracks 132, and guide window sash 110 to slide up (open) and down (closed) as illustrated in FIG. 1-3. When sash lock handles 148 of both combination latches 140L and 140R are in their tilt positions, the tips of both latch bolts 146 are retracted and disengage from tracks 132, but the pivot pins projecting from stiles still engage tracks 132 and permit tilting of lower sash 110 as illustrated in FIG. 1-4.

FIGS. 2-1, 2-2, and 2-3 respectively show top, bottom, and cross-sectional views of a combination latch 140 in accordance with an example of the present disclosure. Combination latch 140 includes a sash lock 142, a sash lock keeper 144, and a tilt latch assembly 230.

Sash lock 142 includes a housing 212, a cam 214, a handle 148, and may include a wave spring (not shown). Housing 212, which may be pressed, stamped, molded, or machined metal or other durable material, includes mounting structure such as screw holes or other features for mounting of housing 212 on a check rail of a window sash. Housing 212 further includes a central opening, collar, or bushing through which handle 148 and cam 214 are connected or keyed to each other and rotatably mounted on housing 212. Handle 148 is located above housing 212 and may be a lever of any devices that may be manually rotated. Handle 148 attaches to cam 214, which is located under housing 212, so that rotation of handle 148 also rotates cam 214.

Cam 214, which may be pressed, stamped, molded, or machined metal or other durable material, is asymmetrically shaped around its rotation axis. The asymmetric shape of cam 214 causes a portion of cam 214, when rotated to the lock orientation, to extend past an edge housing 212 and engage a keeper 144 that is adjacent to housing. Cam 214 may be keyed to the handle 148 to maintain proper orientation during assembly. Cam 214 has a protruded stop feature which interacts with the bottom side of the housing 212 to limit of rotation. FIG. 3-1 shows sash lock 142 with handle 148 and cam 214 in a lock position where a portion of cam 214 extends beyond the edge of housing 212. The bottom view of FIG. 2-2 shows how sash lock keeper 144 overhangs a notch 224 into which a portion of cam 214 extends when in the lock position and sash lock keeper 144 is properly placed on the check rail of the top sash. Cam 214 on one sash extending into sash lock keeper 144 on the other sash prevents raising or lowering of either sash. The portion of cam 214 that extends beyond housing 212 may also include a raised edge 310 that hooks behind a downward-extending tab in the keeper and draws and holds the check rails of the bottom and top sashes together. FIG. 3-2 shows how cam 214 may be asymmetric shaped such that when cam 214 is rotated to an unlock position no portion of cam 214 extends beyond housing 212, and sash lock 142 does not prevent vertical sliding of the bottom (or top) window sash.

Figures 1, 2, 3, 4:
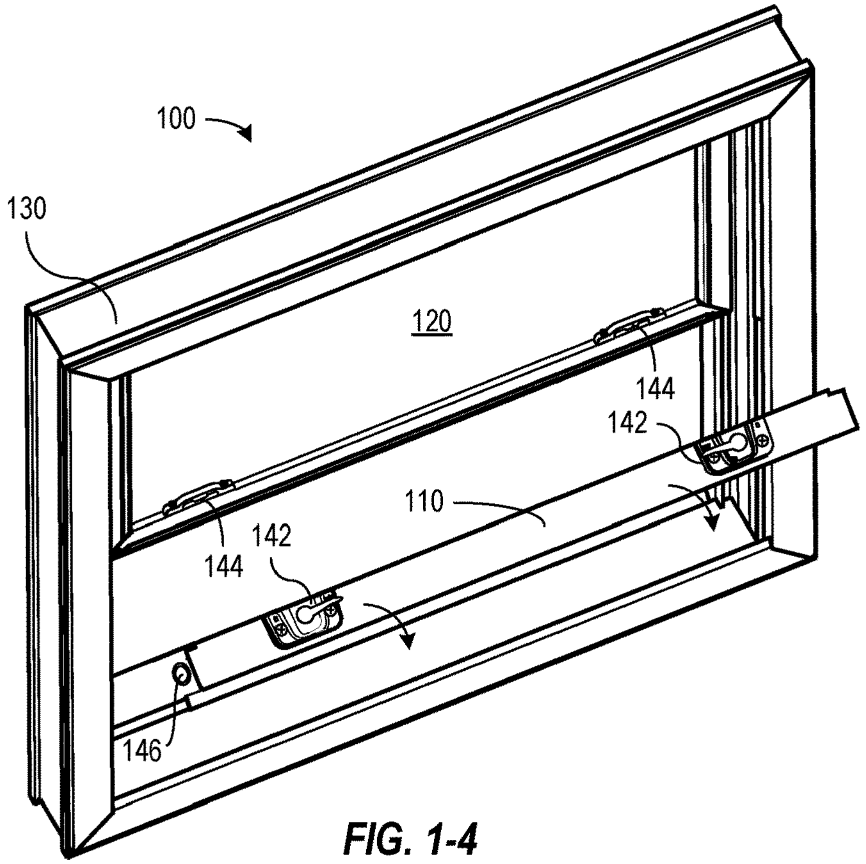
Figures 1, 2:
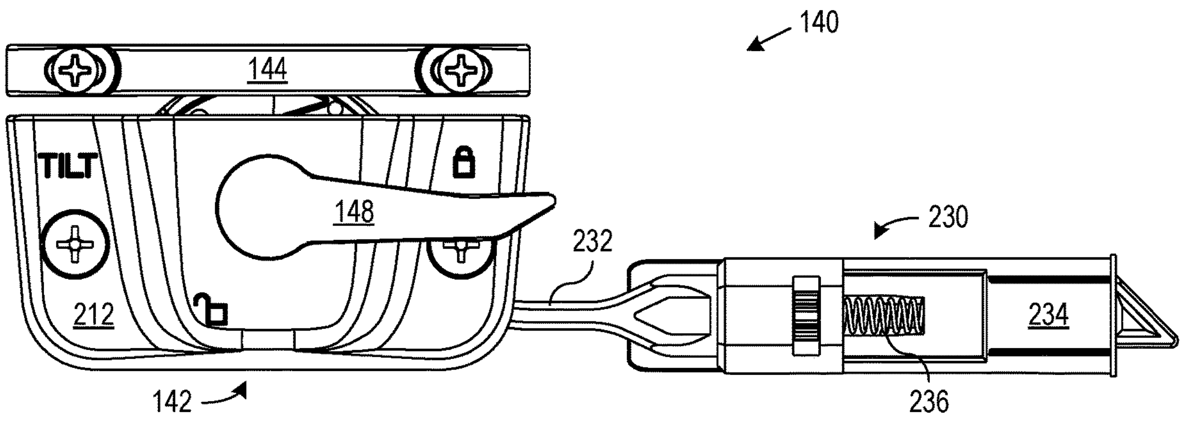
Figure 2:
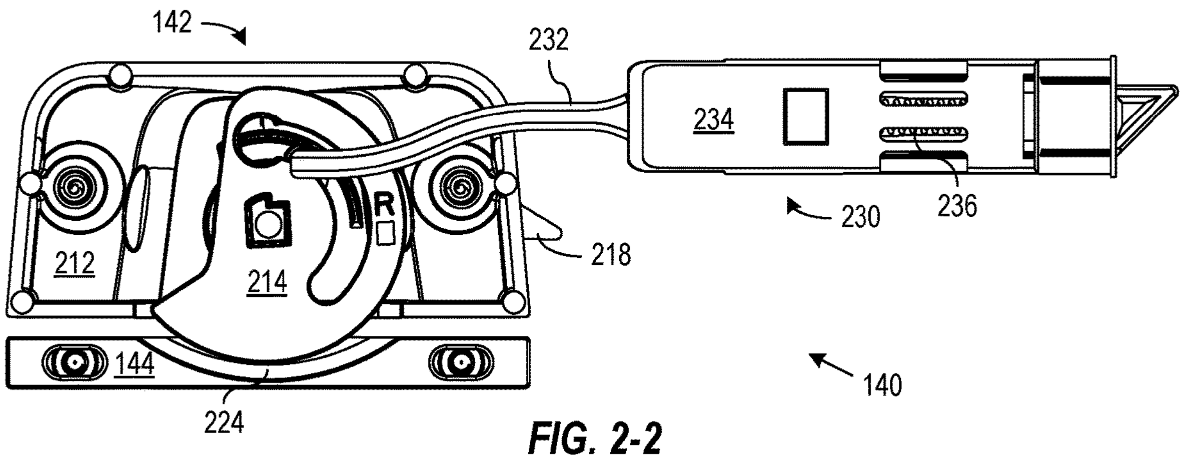
Figures 2, 3:
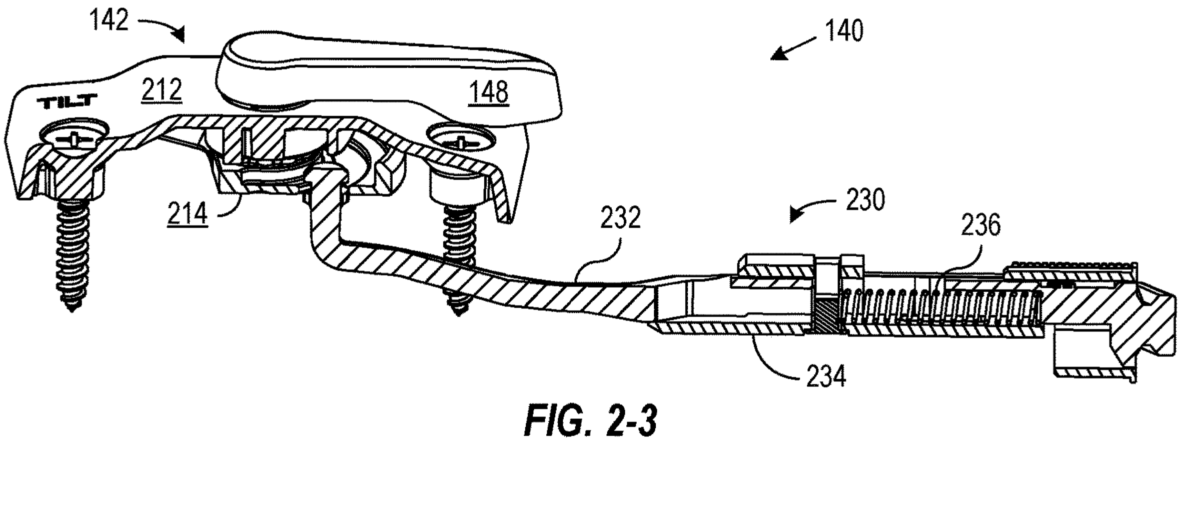
Figures 1, 3:
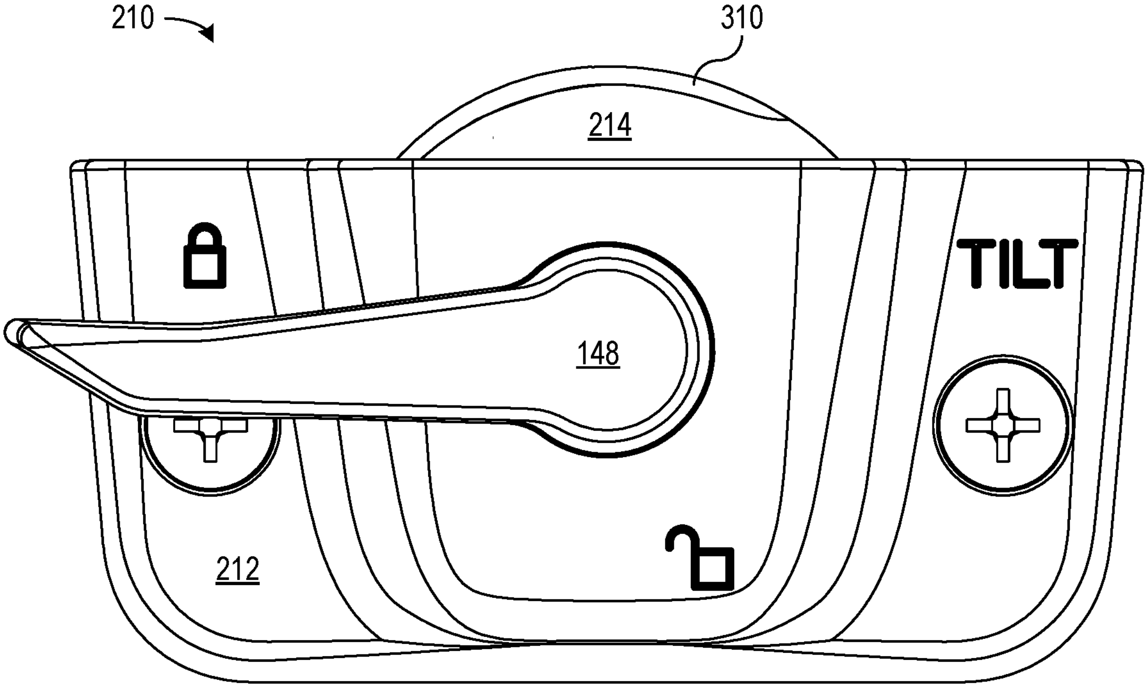
Figures 2, 3:
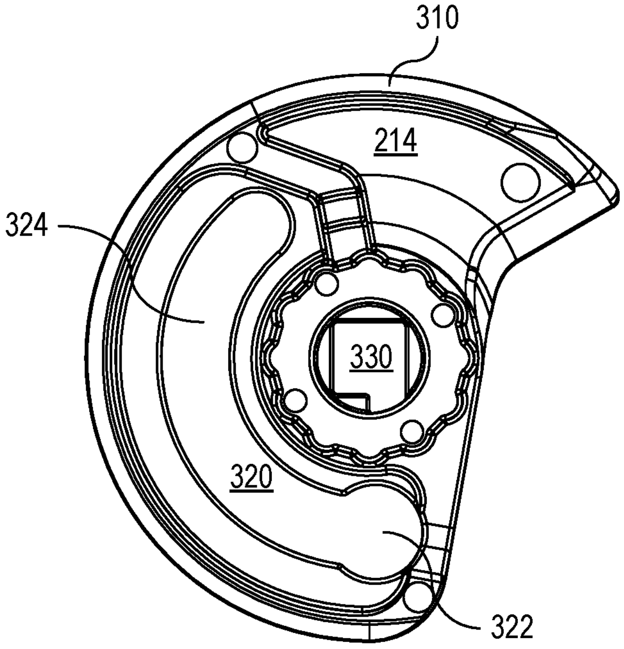
Figures 1, 4:
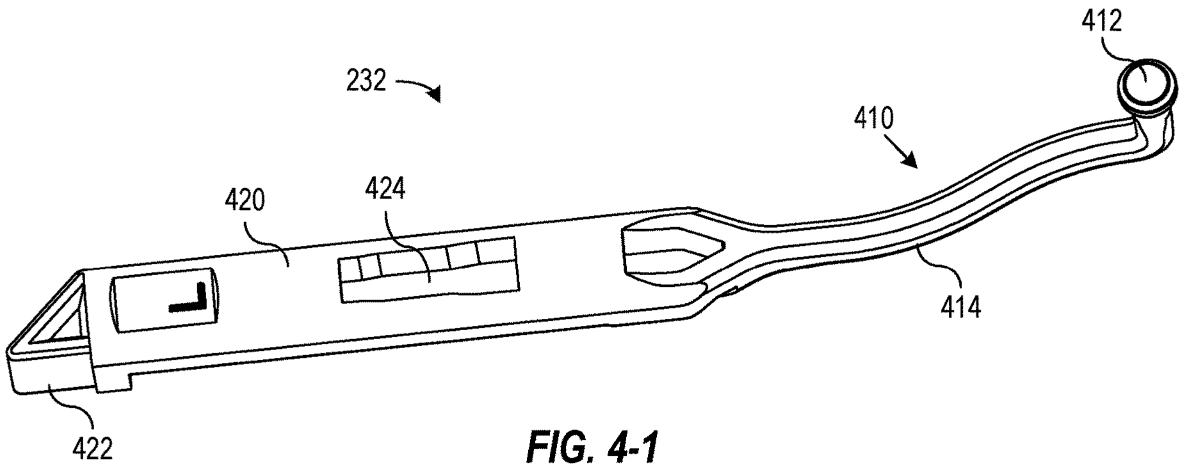
Figures 2, 4:
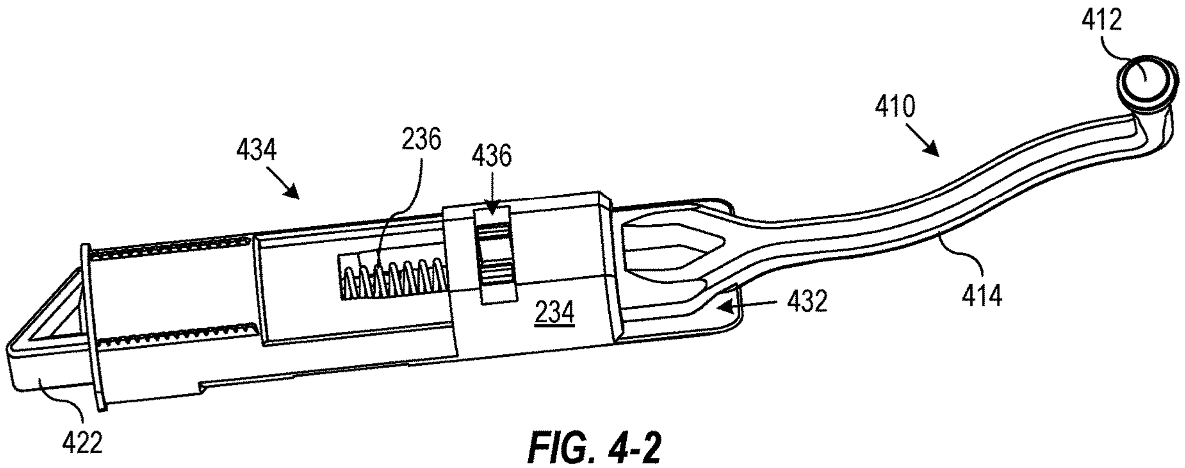
Figures 3, 4:
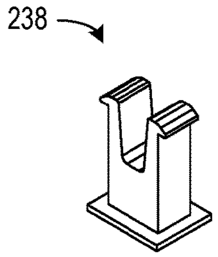

Tilt latch assembly 230 includes a latch bolt 232, a latch bolt housing 234, a spring 236, and a stop clip 238. In accordance with an aspect of the current disclosure, latch bolt 232 may be a solid, one-piece structure that may be a cast or machined piece of metal or other durable material. FIG. 4-1 shows an example in which latch bolt 232 includes a connector 410 and a slide portion 420 that are integrated into a one-piece structure. Connector 410 includes a head 412 that is shaped to fit into a slot 320 (shown in FIG. 3-2) in cam 214 of sash lock 142 and a curved extension 414 that extends from head 412 to slider 420. In general, the length and shape of curved extension 414 can be tailored according to routing profiles for windows in which combination latch 140 will be installed. For example, extension 414 may be adapted or curved to fit the size or thickness stiles or side rails of a sash and the location along a top or check rail where sash lock 142 will be installed on the sash. Head 412 of latch bolt may be enlarged or bulb shaped and may be sized to fit through an enlarged opening 322 of slot 320, while head 412 has a diameter larger than the width of an arc-shaped portion 324 of slot 320. As a result, head 412 of latch bolt 232 may only be inserted into or removed from slot 320 in cam 214 when cam 214 and latch bolt 232 are positioned and oriented so that head 412 coincides with enlarged opening 322 in slot 320, and latch bolt 232 cannot otherwise slip out of slot 320 of cam 214.

Slide portion 420 of latch bolt 232 includes a tip or striker 422 and a spring or clip slot 424 and is otherwise shaped to fit into a slot 432 in latch bolt housing 234 as shown in FIG. 4-2. For assembly of sash bolt assembly 230, slide portion 420 of latch bolt 232 may be slid into slot 432 in latch bolt housing 234 until slot 424 in latch bolt 232 is accessible through an opening 434 in latch bolt housing 234. Latch spring 236 may be fit into place in slot 434 with one end of spring 236 abutting latch bolt 232 at an outer end of slot 424. An opposite end of spring abuts stop clip 238, which may be installed through in a clip slot 436 in latch bolt housing 234. Stop clip 238 when installed extends through slot 424 near an inner end of slot 424 and is held in place on latch bolt housing 234, while slot 424 permits latch bolt 232 to slide relative to latch bolt housing 234 and stop clip 238 to compress spring 236. Spring 236 is thus biased to push tip 422 out of latch bolt housing 234, but compression of spring 236, either from pushing on tip 422 or pulling on head 412, can retract tip 422 into latch bolt housing 234. Stop clip 238 as shown in FIG. 4-3 may be shaped with hooked spring arms that compress while stop clip 238 is being installed and spring back to hold spring 236 in place and prevent removal of latch bolt 232 from latch bolt housing 234 while stop clip 238 is in place on latch bolt housing 234.

Combination latch 140 when typically installed in a window has sash lock 142 secured on a check rail of a sash and latch assembly housing 234 secured in routing through a stile of the sash and extending through the check rail to below sash lock 142. FIGS. 5-1, 5-2, and 5-3, which show views of combination latch 140 with the check rail hidden and sash lock housing 212 transparent, illustrate operation of combination latch 140 respectively in its lock, unlock, and tilt positions. In the lock position shown in FIG. 5-1, cam 214 of sash lock 142 extends past the edge of housing 212 and the check rail of the window sash to engage a keeper or other structure to prevent movement of the window sash. In the unlock position shown in FIG. 5-2, cam 214 of sash lock 142 does not extends past the edge of housing 212, and sash lock 142 does not inhibit opening or closing of the window sash on which sash lock 142 is mounted.

Figures 1, 5:
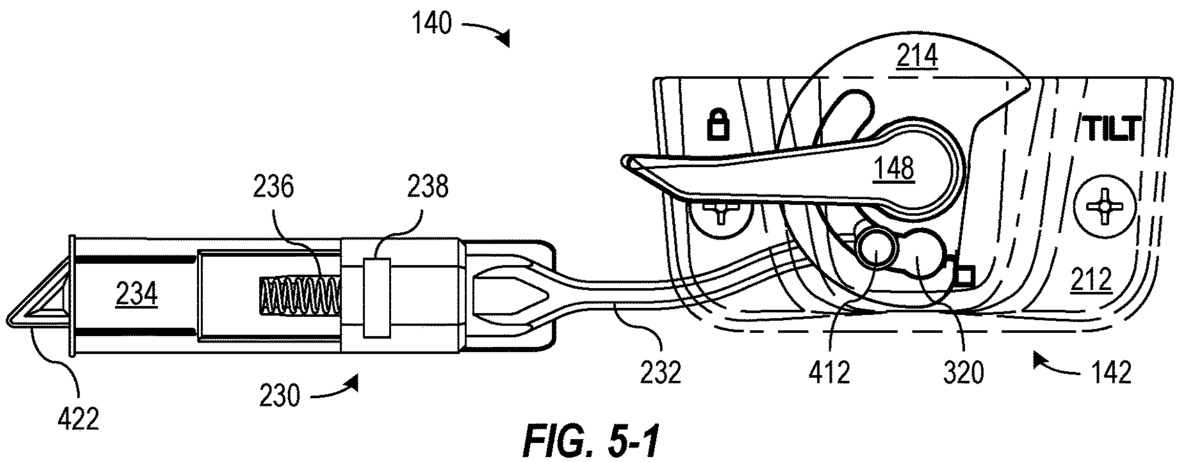
Figures 2, 5:
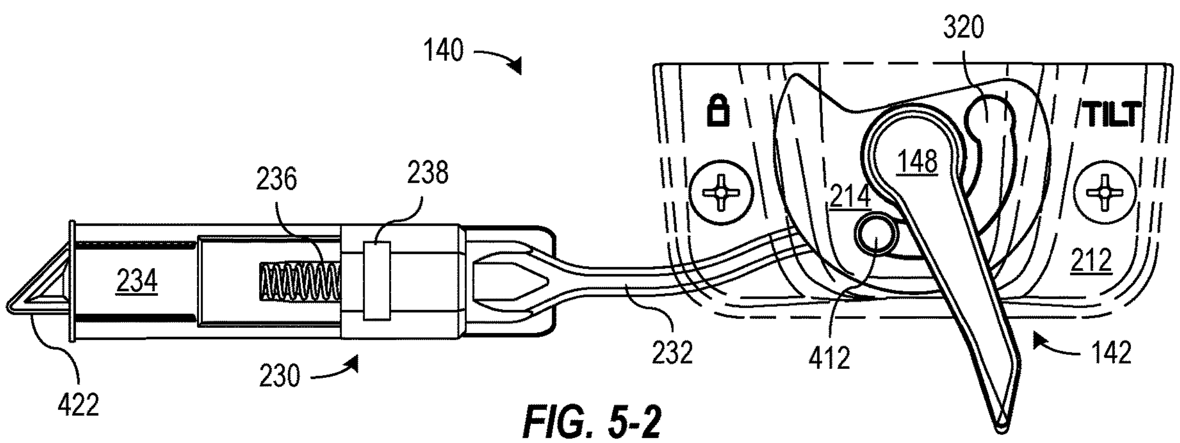
Figures 3, 5:
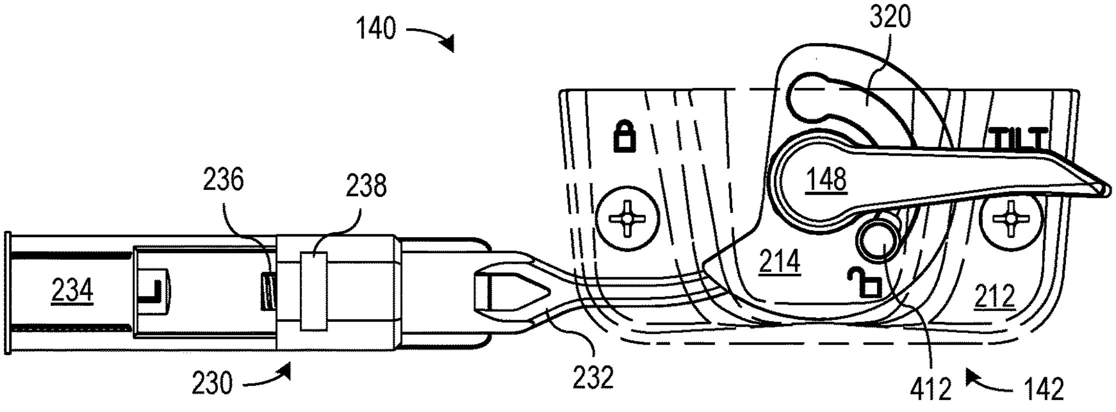

The lock and unlock positions of sash lock 142 as respectively shown in FIGS. 5-1 and 5-2 illustrate positions in which head 412 of latch bolt 232 rides freely within the clearance of slot 320 in cam 214 of sash lock 142. Slot 320 in cam 214 is arc-shaped so that spring 236 acting on latch bolt 232 can keep head 412 of latch bolt 232 stationary as cam lock handle 148 rotates from the lock position of FIG. 5-1 to the unlock position of FIG. 5-2. Additionally, in the lock and unlock positions, slot 320 provides clearance that permits pressure on tip 422 of latch bolt 232 to depress spring 236 and slide head 412 back in slot 320. If necessary, curved extension 414 or other portions of latch bolt 232 may be able to flex slightly or notch 320 may be sized to accommodate movement of latch bolt 232 relative to cam 214. To achieve the desired flexibility and strength, latch bolt 232 may be molded from acetal, nylon, or another durable plastic or polymer material. The flexibility of extension 414 of latch bolt 232 and the angled shape of tip 422 of latch bolt 232 may permit closing of a tilted window sash even when sash lock 142 is in the lock or unlock (or tilt) position. In the unlock position of FIG. 5-2, cam 214 is disengaged from the keeper and permits sliding movement, e.g., raising and lowering, of the window sash, but spring 236 keeps latch bolt tip 422 extended from the side stile of the window sash, so that tip 422 may limit movement of the window sash to sliding up (open) and down (closed).

Rotation of sash lock handle 148 from the unlock position shown in FIG. 5-2 to the tilt position shown in FIG. 5-3 causes the end of slot 320 in cam 214 to contact and pull latch bolt 232 towards the sash lock 142, retracting latch bolt 232. (In order to rotate sash lock handle 148 to the tilt position, sash lock 142 may need above keeper 144, so cam 214 does not extend past housing 212 and interfere with rotation handle 148 to the tilt position.) In the tilt position, latch spring 236 is fully compressed, and tip 422 of latch bolt 232 does not extend past the side surface of the window sash, allowing tilting of the window sash, e.g., about an axis defined by pivot pins (not shown) projecting from the window stiles into respective tracks in a window frame. Once a sash is tilted or a user otherwise releases sash lock handle 148, tension in spring 236 pushes latch bolt 232, which rotates cam 214 and sash lock handle 148 and returns sash lock 142 from the tilt position of FIG. 5-3 to the unlock position of FIG. 5-2. As noted above, combination latch 140 in the unlock position permits a tilted window, e.g., as shown in FIG. 1-4, to be closed, e.g., rotated to the closed or open position shown in FIG. 1-1 or 1-3.

Figure 6:
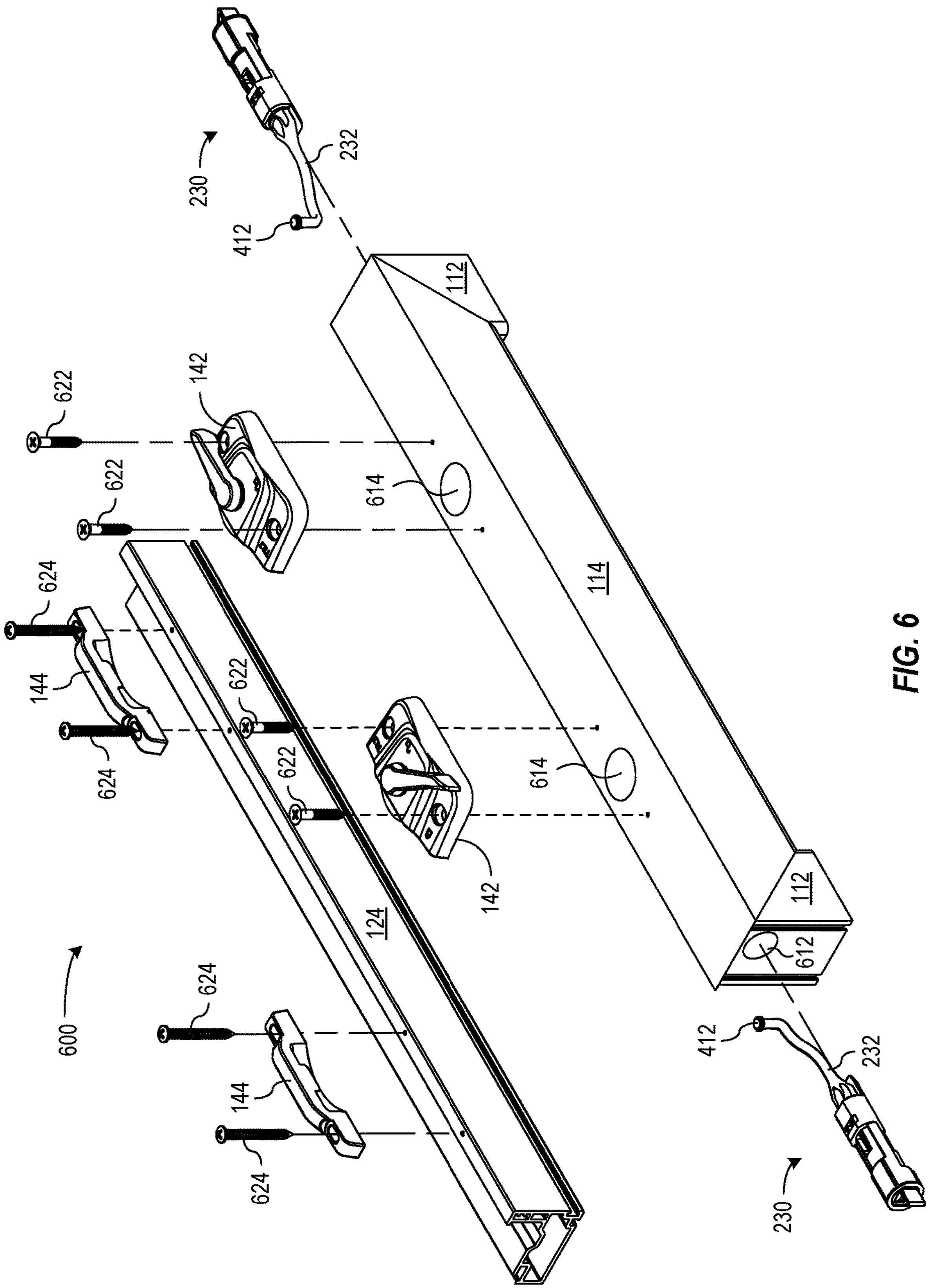
FIG. 6 shows an exploded view illustrating an installation for a two-handed combination window latch system in accordance with an example of the present disclosure.

FIG. 6 is an exploded view illustrating an installation process for a two-handed combination latch system 600 in accordance with an example of the present disclosure. For the installation, stiles 112 and a check rail 114 of a bottom sash are routed or fabricated to include vertical holes 614 in positions where sash locks 142 are to be installed and horizontal holes 612 where tilt latch assemblies 230 are to be inserted and secured. Tilt latch assemblies 230 may be pushed into circular routing holes 612 through stiles 112. The insertion of a tilt latch assembly 230 may require rotating the latch assembly 230 to orient latch bolts 232 to pass through routing that extends between openings 612 and 614, and heads 412 of latch bolts 232 may extend above the top surface of top rail 114 when tilt latch assemblies 230 are inserted. Each sash lock 142 may then be placed onto top rail while aligning latch bolt head 412 with the large opening of the slot in the cam of the sash lock 142. Once head 412 slides past the cam in the sash lock 142, the sash lock 142 may be rotated to align screw holes in the housing of the sash lock 142 with screw holes in check rail 114. Once the screw holes are aligned, screws 622 can secure the sash lock 142 to the check rail. Keepers 144 may be similarly secured to the check rail 124 of the top sash using screws 624.

Figure 7:
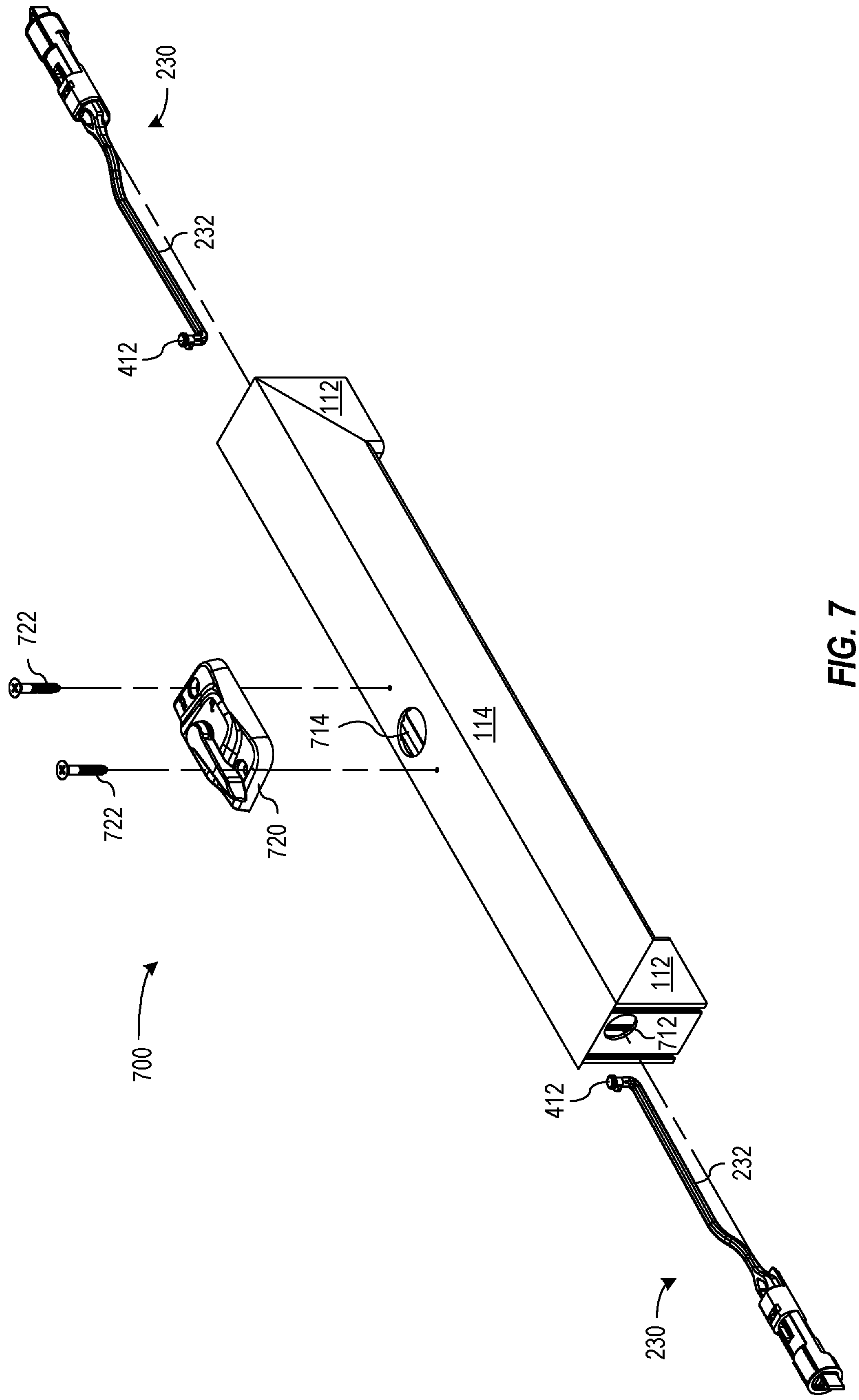
FIG. 7 shows an exploded view illustrating an installation for a one-handed combination window latch system in accordance with an example of the present disclosure.

FIG. 7 is an exploded view illustrating an installation process for a one-handed combination latch system 700 in accordance with an example of the present disclosure. For the installation, stiles 112 and a check rail 114 of a bottom sash are routed or fabricated to include horizontal and vertical routings 712 and 714. Vertical routing 714 is in a position, e.g., the center of check rail 114, where a sash lock 720 is to be installed, and horizontal routing 712 extends from one stile 112 to the other stile 112 and is in communication with vertical bore 714. Two tilt latch assemblies 230 are inserted and secured in the openings at opposite ends of horizontal routing 712. Latch assemblies 230 may be the same as described above but have latch bolts 232 that are long enough to reach sash lock 720 at the center of check rail 114. Sash lock 720 may contain a housing, a handle, and a wave spring that are the same as in sash 142 described above, but the cam (not shown) in sash lock 720 may include two slots like slot 320 that respectively engage the heads 412 of the two latch bolts 232. The insertion of each tilt latch assembly 230 may require rotating the latch assembly 230 to orient latch bolts 232 to pass through routing that extends to vertical bore 714, and heads 412 of latch bolts 232 may extend above the top surface of top rail 114 when tilt latch assemblies 230 are inserted. Sash lock 720 may then be placed onto check rail 114 while aligning latch bolt heads 412 with the large openings of the slots in the cam of the sash lock 720. Once heads 412 are engaged in the cam in the sash lock 720, the sash lock 720 may be aligned, so that screws 722 can secure the sash lock 720 to the check rail 114. A keeper (not shown) may be similarly secured to the check rail of the top sash.

A latch bolt 232 as disclosed herein may have a one-piece structure that extends from the head 412 engaged in the slot 320 in the cam 314 to tip 422 at the surface of stile 112. The one-piece latch bolt 232 (and specifically extension 414) may be flexible to allow head 412 to follow slot 320 when an external force is applied to depress tip 422. The flexibility also allows or facilitates assembly of latch bolt 232 into latch housing 234. The flexibility further allows or facilitates installation of the tilt latch assembly 230 through the window stile and sash check rail while being rotated into a final position in the stile. Flexibility may also allow a tilt latch assembly to accommodate multiple window profiles of different geometries.

Although specific implementations have been disclosed, these implementations are only examples and should not be taken as limitations. Various adaptations and combinations of features of the implementations disclosed are within the scope of the following claims.

What is claimed is:

1. A system comprising:

a sash lock configured for installation on a rail of a window sash, the sash lock including a cam that is rotatable to engage or disengage a keeper to lock or unlock the window sash, the cam including a slot having an enlarged opening and an arc-shaped portion, wherein a width of the arc-shaped portion is smaller than a diameter of the enlarged opening; and a latch assembly including a latch bolt with a enlarged-shaped head that is sized to fit through the enlarged opening of the slot but has a diameter larger than the width of the arc-shaped portion of the slot, the enlarged-shaped head held in the slot while a tip of the latch bolt is adjacent to a surface of a stile of the window sash.

2. The system of claim 1, wherein:

the cam is rotatable to a lock position and an unlock position;

in the lock position, the cam engages the keeper;

rotating the cam from the lock position to the unlock position disengages the cam from the keeper; and during rotation of the cam between the lock position and the unlock position, the tip of the latch bolt remains extended from the surface of the stile and the slot slides relative to the head of the latch bolt wherein the head of the latch bolt rides freely within clearance of the arc-shaped portion of the slot.

3. The system of claim 2, wherein:

the cam is further rotatable to a tilt position;

rotating the cam from the unlock position to the tilt position causes an end of the slot to contact the latch bolt and retract the tip of the latch bolt into the stile, wherein the latch bolt head can only be inserted into or removed from the slot when the cam and latch bolt are positioned so that the head coincides with the enlarged opening in the slot.

4. The system of claim 3, further comprising:

a spring system biased to rotate the cam from the tilt position to the unlock position when no external pressure is applied to rotate the cam to the tilt position.

5. The system of claim 1, wherein the sash lock further comprises:

a housing containing the cam; and a handle above the housing, the handle and the cam being coupled to rotate together relative to the housing.

6. The system of claim 5, wherein: a shape of the slot follows an arc about a rotation axis of the handle and the cam.

7. The system of claim 1, wherein the latch assembly further comprises:

a latch bolt housing in which a first portion of the latch bolt resides;

a clip affixed to the latch bolt housing and extending through an opening through the latch bolt; and a spring in the opening and having a first end abutting the latch bolt and a second end abutting the clip.

8. The system of claim 7, wherein: the spring is biased to rotate the cam from a tilt position to an unlock position and the tip of the latch bolt to protrude from the stile when no external pressure is applied to rotate the cam to the tilt position.

9. The system of claim 1, wherein: the latch bolt is a one-piece structure.

10. The system of claim 9, wherein the latch assembly further comprises:

a latch bolt housing that anchors in the stile, the latch bolt having a slide portion from which the tip extends and an extension portion extending from the slide portion to the head of the latch bolt, the slide portion being slidably mounted in the latch bolt housing.

11. The system of claim 10, wherein: the extension portion of the latch bolt flexes to allow the head of the latch bolt to follow a contour of the slot when external pressure forces the tip to retract and the slide portion to slide in the latch bolt housing.

12. The system of claim 1, wherein: the latch bolt flexes to allow the head of the latch bolt to follow a contour of the slot when external pressure forces the tip to retract into the stile.

13. The system of claim 1, further comprising:

a second latch assembly including a second latch bolt engaged with the sash lock, the second latch bolt having a tip adjacent to a surface of a second stile of the window sash.

14. The system of claim 1, further comprising:

the window sash, the sash lock being on the rail of the window sash and the latch assembly extending through the stile of the window sash;

a second sash lock installed on the rail of the window sash, the second sash lock including a second cam that is rotatable to lock or unlock the window sash, the second cam including a second slot; and a second latch assembly including a second latch bolt with a head held in the second slot while a tip of the second latch bolt is adjacent to a surface of a second stile of the window sash.

* * * * *